(12) United States Patent
Iwauchi

(10) Patent No.: US 7,755,693 B2
(45) Date of Patent: Jul. 13, 2010

(54) IMAGING APPARATUS AND CONTROL METHOD THEREFOR

(75) Inventor: Yoshihiro Iwauchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 598 days.

(21) Appl. No.: 11/685,696

(22) Filed: Mar. 13, 2007

(65) Prior Publication Data

US 2007/0222883 A1    Sep. 27, 2007

(30) Foreign Application Priority Data

Mar. 23, 2006   (JP) .............................. 2006-080909

(51) Int. Cl.
*H04N 5/222*    (2006.01)
*G03B 13/02*    (2006.01)

(52) U.S. Cl. .................. 348/333.09; 396/374

(58) Field of Classification Search ............ 348/333.01, 348/333.09, 333.13; 396/373, 374
See application file for complete search history.

(56) References Cited

U.S. PATENT DOCUMENTS

2002/0196357 A1* 12/2002 Battles et al. .......... 348/333.01
2003/0112347 A1*  6/2003 Wyman ................. 348/231.99
2004/0061797 A1*  4/2004 Takahashi et al. ...... 348/333.01
2004/0125220 A1*  7/2004 Fukuda et al. ............. 348/234
2004/0169758 A1*  9/2004 Murashima et al. .... 348/333.08
2004/0212713 A1* 10/2004 Takemoto et al. ...... 348/333.09
2005/0052553 A1*  3/2005 Kido et al. ................. 348/296

FOREIGN PATENT DOCUMENTS

JP    09-270944 A   10/1997
JP    2001-169150 A  6/2001

* cited by examiner

*Primary Examiner*—Kelly L Jerabek
(74) *Attorney, Agent, or Firm*—Canon U.S.A., Inc. I.P. Division

(57) ABSTRACT

An imaging apparatus including a display device configured to display a shot image includes an external monitor output unit configured to output a signal to an external monitor, a switching unit configured to switch a content of a display on the display device, and a control unit configured to, when a content of the display on the display device is switched to an image display by the switching unit, output a signal corresponding to the image display to the external monitor output unit, and when a content of the display on the display device is switched to an information display by the switching unit, output no signal corresponding to the information display to the external monitor output unit.

3 Claims, 14 Drawing Sheets

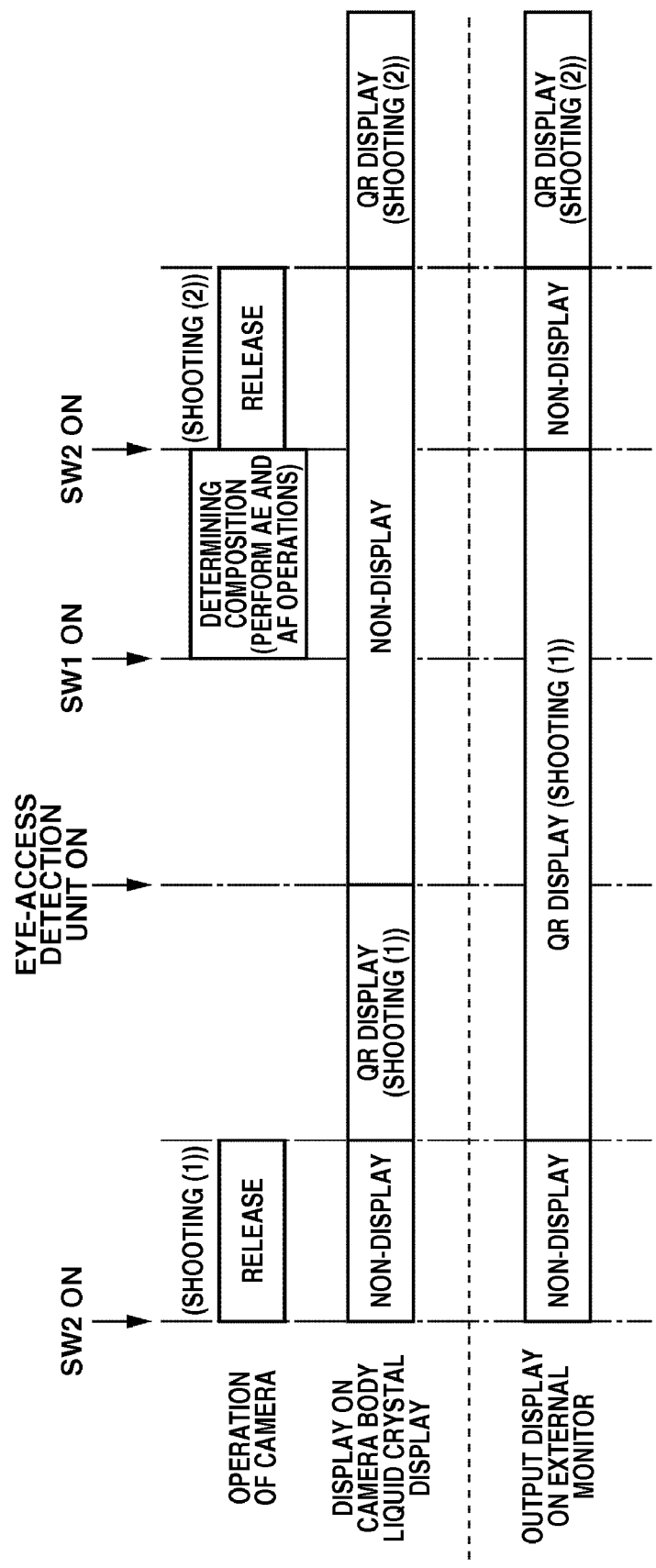

IMAGING APPARATUS AND CONTROL METHOD THEREFOR

BACKGROUND OF THE INVENTION

1. Field of the Invention

The present invention relates to an imaging apparatus, and more specifically, the present invention relates to an imaging apparatus capable of displaying a shot image on a display unit provided in an apparatus body and outputting the shot image to an external monitor.

2. Description of the Related Art

A digital camera is known that includes a liquid crystal display unit and an external monitor output terminal, and is capable of displaying a shot image on the liquid crystal display unit and an external monitor connected thereto via the external monitor output terminal.

Japanese Patent Application Laid-Open No. 09-270944 discusses a digital camera that determines whether an external monitor such as a television monitor is connected to an external monitor output terminal. If an external monitor is connected to the external monitor output terminal, the digital camera inhibits a display of an image on a liquid crystal display unit of a camera body, and displays the image only on the external monitor.

Japanese Patent Application Laid-Open No. 2001-169150 discusses a method used in an electronic camera including a look-in type electronic viewfinder and a rear liquid crystal panel having a display screen larger than the electronic viewfinder. In this method, the electronic viewfinder displays an image output from a charge-coupled device (CCD) as a through image, and the rear liquid crystal panel displays, in a reproduction mode, an image different from the image displayed in the electronic viewfinder, and information indicating a state of the electronic camera.

SUMMARY OF THE INVENTION

According to an aspect of the present invention, an imaging apparatus including a display device configured to display a shot image includes an external monitor output unit configured to output a signal to an external monitor, a switching unit configured to switch a content of a display on the display device, and a control unit configured to, when a content of the display on the display device is switched to an image display by the switching unit, output a signal corresponding to the image display to the external monitor output unit, and when a content of the display on the display device is switched to a information display by the switching unit, output no signal corresponding to the information display to the external monitor output unit.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 14 is a sequence chart according to the second exemplary embodiment of the present invention.

DETAILED DESCRIPTION OF THE EXEMPLARY EMBODIMENTS

Various exemplary embodiments of the present invention will now be described in detail with reference to the drawings. It should be noted that the relative arrangement of the components, the numerical expressions, and numerical values set forth in these embodiments are not intended to limit the scope of the present invention unless it is specifically stated otherwise.

First Exemplary Embodiment

Figure 1:
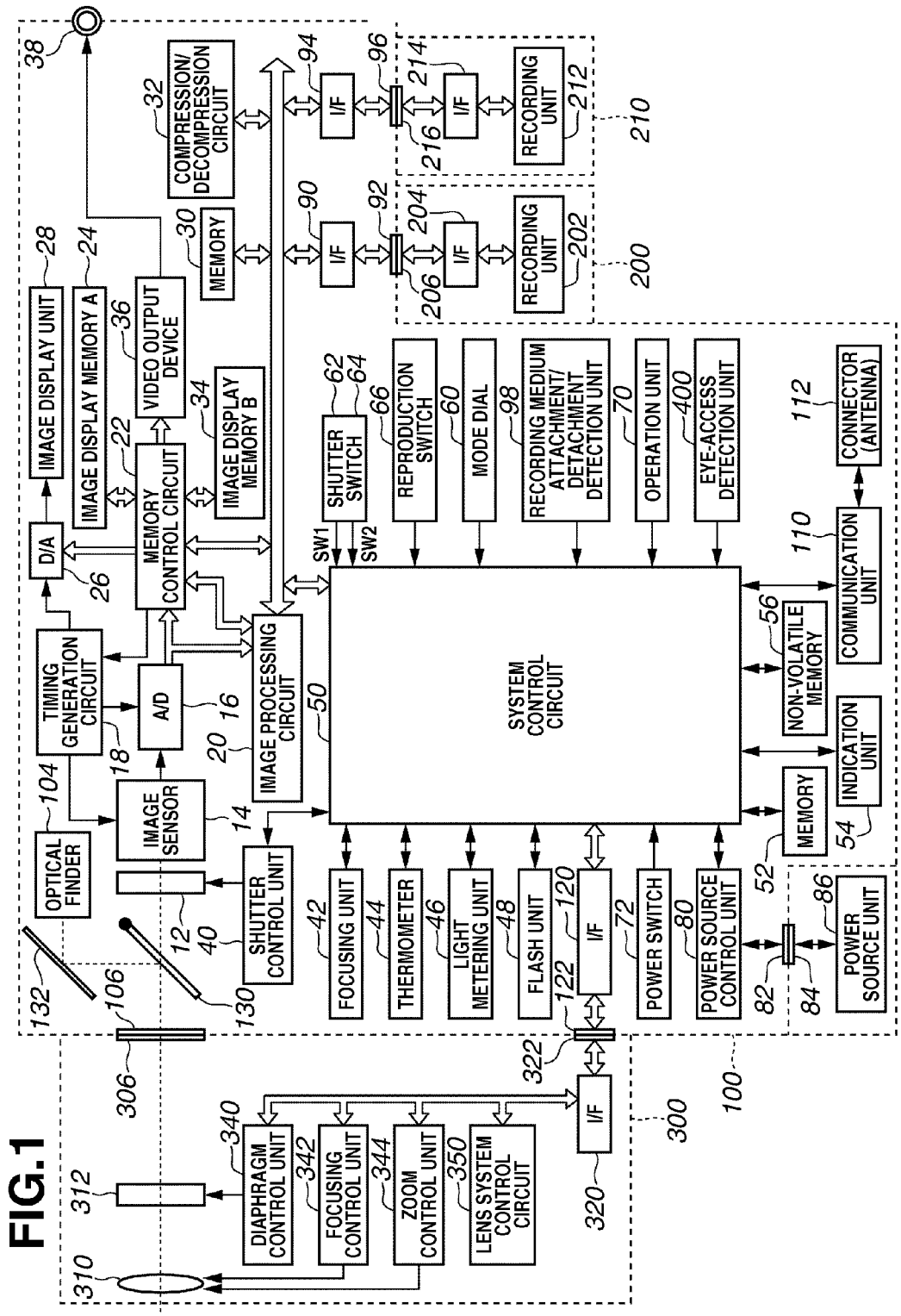
FIG. 1 illustrates a configuration of a digital camera according to a first exemplary embodiment of the present invention.

FIG. 1 illustrates a configuration of a digital camera according to a first exemplary embodiment of the present invention. Referring to FIG. 1, an image processing apparatus 100 includes a shutter 12 that controls an amount of exposure to an image sensor 14. The image sensor 14 converts an optical image into an electric signal. A light ray that is incident into an image taking lens 310 is guided via a diaphragm 312, lens mounts 306 and 106, a mirror 130, and the shutter 12, to form an optical image onto the image sensor 14. An analog/digital (A/D) converter 16 converts an analog signal output from the image sensor 14 into a digital signal. A timing generation circuit 18 supplies a clock signal and a control signal to the image sensor 14, the A/D converter 16, and a digital/analog (D/A) converter 26. The D/A converter 26 is controlled by a memory control circuit 22 and a system control circuit 50.

An image processing circuit 20 performs pixel interpolation processing and color conversion processing on data from the A/D converter 16 or data from the memory control circuit 22. Furthermore, the image processing circuit 20, as necessary, performs given computation processing using data of a shot image. The system control circuit 50, based on a result of the computation by the image processing circuit 20, controls a shutter control unit 40 and a focus detection unit 42. The system control circuit 50 controls the shutter control unit 40 and the focus detection unit 42 so that TTL (through-the-lens) auto focus (AF) processing, automatic exposure (AE) processing, and flash control (EF) processing can be performed. The image processing circuit 20 performs given computation processing using data of the shot image, and based on a result of the computation, performs TTL auto white balance (AWB) processing.

In the present exemplary embodiment, the image processing apparatus 100 includes the focus detection unit 42 and a light metering unit 46 as dedicated units. Accordingly, the AF processing, the AE processing, and the EF processing can be performed using the focus detection unit 42 and the light metering unit 46 while the AF processing, the AE processing, and the EF processing using the image processing circuit 20 are not performed. Alternatively, the AF processing, the AE processing, and the EF processing can be performed using the focus detection unit 42 and the light metering unit 46, and in addition, the AF processing, the AE processing, and the EF processing can also be performed using the image processing circuit 20.

The memory control circuit 22 controls the A/D converter 16, the timing generation circuit 18, the image processing circuit 20, an image display memory A 24, an image display memory B 34, the D/A converter 26, a memory 30, and a compression/decompression circuit 32. Data from the A/D converter 16 is written onto the image display memory A 24, the image display memory B 34, or the memory 30 via the image processing circuit 20 and the memory control circuit 22 or directly via the memory control circuit 22.

The image processing apparatus 100 includes the image display memory A 24, the image display memory B 34, the D/A converter 26, and an image display unit 28. The image display unit 28 includes, for example, a thin-film transistor (TFT) liquid crystal display (LCD). Image data for display, which is written onto the image display memory A 24 or the image display memory B 34, is displayed on the image display unit 28 via the D/A converter 26. Moreover, the image display unit 28 is capable of displaying camera information and information related to shooting. By serially displaying data of a shot image, an electronic finder function can be implemented.

Furthermore, the image display unit 28 is capable of arbitrarily turning on and off a display according to an instruction from the system control circuit 50. When a display is turned off, power consumption of the image processing apparatus 100 can be significantly reduced. A video output device 36 is capable of displaying image data, which is written on the image display memory A 24 or the image display memory B 34, on an external monitor via an external output terminal 38. In the present exemplary embodiment, an external monitor is connected via the external output terminal 38 using a cable. However, the digital camera and an external monitor can be wirelessly connected. In this case, the image processing apparatus 100 includes a wireless sending unit, instead of the external output terminal 38.

The memory 30 stores a shot still image and a shot moving image. The memory 30 has a storage capacity large enough for storing a given number of still images and a given time of moving image.

Thus, a large number of images can be written on the memory 30 at a high speed in the case of panoramic shooting and continuous shooting in which a plurality of still images are serially shot. The memory 30 can also be used as a work area of the system control circuit 50.

The compression/decompression circuit 32 compresses and decompresses image data, for example, by an adaptive discrete cosine transform (ADCT). The compression/decompression circuit 32 reads an image stored in the memory 30, performs compression or decompression processing, and writes processed data onto the memory 30.

The shutter control unit 40 controls the shutter 12 in cooperation with a diaphragm control unit 340 that controls the diaphragm 312, based on light metering information from the light metering unit 46. The focus detection unit 42 performs AF processing. A light ray that is incident into the image taking lens 310, is guided to be incident into the focus detection unit 42 via the diaphragm 312, the lens mounts 306 and 106, the mirror 130, and a sub mirror for focusing (not shown), using a single-lens reflex system, so that the focus detection unit 42 can determine an in-focus state of an image formed as an optical image.

A thermometer 44 is capable of determining a temperature of a shooting environment. When the thermometer 44 is provided within a sensor, dark current occurring in the sensor can be more precisely predicted. The light metering unit 46 performs AE processing. A light ray that is incident into the image taking lens 310, is guided to be incident into the light metering unit 46 via the diaphragm 312, the lens mounts 306 and 106, the mirror 130, a mirror 132, and a lens for light metering (not shown), using a single-lens reflex system, so that the light metering unit 46 unit 42 can determine an exposure state of an image formed as an optical image. The light metering unit 46 includes an EF processing function, which is performed in cooperation with a flash unit 48. The flash unit 48 includes a function for projecting AF auxiliary light and a flash light control function.

The image processing circuit 20 computes data of an image taken by the image sensor 14. Based on a result of computation by the image processing circuit 20, an exposure control and an AF control can also be performed using a video TTL system in which the system control circuit 50 performs control on the shutter control unit 40, the diaphragm control unit 340, and a focusing control unit 342. Furthermore, an AF control can be performed using both a result of measuring by the focus detection unit 42, and a result of computation by the image processing circuit 20 of the image data taken by the image sensor 14. In addition, an exposure control can also be performed using both a result of metering by the light metering unit 46, and a result of computation by the image processing circuit 20 of the image data taken by the image sensor 14.

The system control circuit 50 controls the image processing apparatus 100. A memory 52 stores a constant, a variant, and a program used for operating the system control circuit 50.

An indication unit 54 includes, for example, a liquid crystal display apparatus and a speaker that indicates an operation state of the image processing apparatus 100 and a message, using a text, an image, and audio data according to an execution of a program by the system control circuit 50. One or more indication units 54 are provided at a position where a user can easily and visually identify the indication units in the vicinity of an operation unit of the image processing apparatus 100. The indication units 54 include combination of an LCD, a light emitting diode (LED), and a sound generation device. Furthermore, a certain function of the indication unit 54 is provided in an optical finder 104. By using the function, a photographer can recognize information related to shooting when the photographer looks into the optical finder 104.

The indication unit 54 displays various display contents on the LCD. The display contents displayed on the LCD include, for example, whether single shooting or continuous shooting is selected, a self timer, a compression rate, an International Standards Organization (ISO) sensitivity, a number of recording pixels, a number of recording images, a number of remaining shootable images, a shutter speed, a diaphragm value, exposure correction, a flash, relaxation of red-eye phenomenon, macrophotography, a buzzer setting, remaining amount of charge of a clock battery, remaining amount of charge of a digital camera battery, an error, information indicated by a plurality of digits, whether recording media 200 and 210 are mounted or dismounted, whether a lens unit 300 is mounted or dismounted, an operation state of a communication interface (I/F), a date and time, and a state of connection with an external computer.

The indication unit 54 displays various display contents on the LED. The display contents displayed on the LED include, for example, an in-focus state, completion of shooting preparations, a warning about camera shake, charging of a flash, completion of charging for a flash, an operation state for writing onto the recording media 200 and 210, a notice as to a setting for macrophotography, and a state of charging for a secondary battery. In addition, the indication unit 54 displays various display contents on an indicator lamp. The display contents displayed on the indicator lamp include, for example, a notification as to a self timer. The lamp indicating a self timer notification can be commonly used with AF auxiliary light.

A non-volatile memory 56 can be electrically erased and recorded. An electrically erasable programmable read-only memory (EEPROM) and a flash memory are used for the non-volatile memory 56. The non-volatile memory 56 stores various parameters. Operation units 60, 62, 64, and 66 are used for inputting various instructions to operate the system control circuit 50. Each of the operation units 60, 62, 64, and 66 includes, in combination or in singularity, a switch, a dial, a touch panel, a pointing device using sight detection, and a voice recognition device.

Here, the operation units 60, 62, 64, and 66 are described in detail. A mode dial switch 60 is used for switching between various functional shooting modes. The shooting modes switched by operating the mode dial switch 60 includes, for example, an automatic shooting mode, a program shooting mode, a shutter speed prioritized shooting mode, a diaphragm value (F number) prioritized shooting mode, a manual shooting mode, a focal depth prioritized shooting mode, a portrait shooting mode, a scenery shooting mode, a close-up shooting mode, a sport shooting mode, a night scene shooting mode, a panoramic shooting mode, and a flash projection inhibition mode.

A shutter switch SW1 62 is turned on at a first stroke of a shutter button (not shown). When the shutter switch SW1 62 is turned on, an operation such as AF processing, AE processing, AWB processing, and EF processing is started.

A shutter switch SW2 64 is turned on at a second stroke of the shutter button (not shown) following a first stroke thereof. When the shutter switch SW2 64 is turned on, a series of operations are performed such as exposure processing in which a signal read from the image sensor 14 is written as image data onto the memory 30 via the A/D converter 16 and the memory control circuit 22, development processing using a computation by the image processing circuit 20 and the memory control circuit 22, compression and decompression processing in which the image data is read out from the memory 30 and compressed by the compression/decompression circuit 32, and recording processing in which image data is written onto the recording medium 200 or 210.

A reproduction switch 66 is used for instructing a start of a reproduction operation in which a shot image is read from the memory 30, the recording medium 200 or 210 and is displayed in the image display unit 28 or in an external monitor connected via the video output device 36. An operation unit 70 includes various buttons and a touch panel. The buttons in the operation unit 70 includes a menu button, a menu shift "+" (plus) button, a menu shift "−" (minus) button, a reproduced image shift "+" (plus) button, and a reproduced image shift "−" (minus) button.

With respect to each function attributed to the plus and the minus buttons, by providing a rotational dial switch (not shown) to the digital camera, selection of a function and a value for a function can be more easily performed.

A power switch 72 is used for switching between a power-on mode and a power-off mode of the image processing apparatus 100. In addition, using the power switch 72, various apparatuses connected to the image processing apparatus 100 such as the lens unit 300, an external flash unit, and the recording media 200 and 210 can be powered on and off.

A power source control unit 80 includes a battery cell detection circuit, a direct current-direct current (DC-DC) converter, and a switch circuit for changing a block which carries current. The power source control unit 80 determines whether the a battery is mounted, a type of the battery, a remaining amount of charge of the battery, controls the DC-DC converter based on a result of the determination and an instruction from the system control circuit 50, and supplies a necessary voltage to each unit and portion including the recording media 200 and 210, for a necessary length of time.

The image processing apparatus 100 also includes connectors 82 and 84. A power source unit 86 includes a primary cell such as an alkaline cell and a lithium cell, a secondary cell such as a NiCd cell, an NiMH cell, and an Li cell, and an alternate current (AC) adaptor. Furthermore, the image processing apparatus 100 includes interfaces 90 and 94 with a recording medium such as a memory card and a hard disk, connectors 92 and 96 for connecting to a recording medium such as a memory card and a hard disk, and a recording medium attachment/detachment detection unit 98 that detects whether the recording medium 200 or 210 is mounted to the connector 92 and/or the connector 96.

In the present exemplary embodiment, two systems of interfaces and connectors are described to which a recording medium is mounted. However, only one system of an interface and a connector, or a plurality of systems of interfaces and connectors can be provided to which a recording medium is mounted. Alternatively, interfaces and connectors of different standards can be provided in combination.

For an interface and a connector, those complying with standards of a Personal Computer Memory Card International Association (PCMCIA) card and a CompactFlash® (CF) card can be used.

When the interfaces 90 and 94 and the connectors 92 and 96 complying with a standard such as a PCMCIA card and a CompactFlash® (CF) card are used, by connecting to the image processing apparatus 100 various communication cards such as a universal serial bus (USB) card, an Institute of Electrical and Electronics Engineers (IEEE) 1394 card, a P1284 card, a small computer systems interface (SCSI) card, and a communication card for a personal handy phone system (PHS), image data and management information attached to the image data can be transferred between the image processing apparatus 100 and another computer or a peripheral device such as a printer.

The optical finder 104, using a single-lens reflex system, guides a light ray incident into the image taking lens 310, via the diaphragm 312, the lens mounts 306 and 106, and the mirror 130, to form and display an optical image. Thus, shooting can be performed only by using the optical finder 104 without using an electronic finder function of the image display unit 28.

The indication unit 54 displays various display contents on a display unit in the optical finder 104. The display contents displayed on display unit in the optical finder 104 include a notification to a photographer such as an in-focus state, completion of shooting preparations, a warning about camera shake, charging of a flash, completion of charging of a flash, and an operation state for writing onto the recording media 200 and 210. Furthermore, the display contents displayed on display unit in the optical finder 104 include a value set for an item related to shooting such as a shutter speed, a diaphragm value, an exposure correction, an ISO sensitivity, a white balance setting value, an image quality for shooting and recording, a size of a shot and recorded image, a method of light metering, whether a single shooting or a continuous shooting is selected, and a focusing point.

An eye-access detection unit 400 is capable of detecting that a photographer looks into the optical finder 104. A function of the image display unit 28 and starting an operation of the focus detection unit 42 and the light metering unit 46 is turned off when it is determined that a photographer looks into the optical finder 104. Thus, the digital camera can be smoothly shifted to a shooting preparation state.

A communication unit 110 includes various communication functions using a Recommended Standard (RS) 232C, a USB, an IEEE 1394, a P1284, a SCSI, a modem, a local area network (LAN), and a wireless communication. A connector 112 connects the image processing apparatus 100 to other devices using the communication unit 110. The connector 112 is an antenna in the case of using a wireless communication.

An interface 120 connects the image processing apparatus 100 to the lens unit 300 in the lens mount 106. A connector 122 electrically connects the image processing apparatus 100 to the lens unit 300. The connector 122 includes a function for communicating a control signal, a status signal, a data signal between the image processing apparatus 100 and the lens unit 300, and supplying a current at various levels of voltages. Moreover, the connector 122 can be used for an optical communication and an audio communication, in addition to an electrical communication.

The mirrors 130 and 132 can, using a single-lens reflex system, guide a light ray incident into the image taking lens 310, to the optical finder 104. The mirror 132 can be either a quick return mirror or a half mirror.

A recording medium 200 can be a memory card or a hard disk. The recording medium 200 includes a recording portion 202 configured by a semiconductor memory and a magnetic disk, an interface 204 with the image processing apparatus 100, and a connector 206 for connecting to the image processing apparatus 100.

A recording medium 210 is a memory card or a hard disk. The recording medium 210 includes a recording portion 212 configured by a semiconductor memory and a magnetic disk, an interface 214 with the image processing apparatus 100, and a connector 216 for connecting to the image processing apparatus 100.

The lens unit 300 is an exchangeable type lens unit. The lens mount 306 is used for mechanically mounting the lens unit 300 onto the image processing apparatus 100. The lens mount 306 includes various functions for electrically connecting the lens unit 300 to the image processing apparatus 100.

In addition, the image processing apparatus 100 includes the image taking lens 310, the diaphragm 312, an interface 320, and a connector 322. The interface 320 is provided in the lens mount 306 and used for connecting the lens unit 300 to the image processing apparatus 100. The connector 322 electrically connects the lens unit 300 to the image processing apparatus 100.

The connector 322 includes a function for communicating a control signal, a status signal, and a data signal between the image processing apparatus 100 and the lens unit 300, and supplying and receiving a current at various levels of voltages. The connector 122 can be used for an optical communication and an audio communication, in addition to an electrical communication.

The diaphragm control unit 340 controls the diaphragm 312 in cooperation with the shutter control unit 40 that controls the shutter 12, based on light metering information from the light metering unit 46. The focusing control unit 342 controls focusing of the image taking lens 310. A zoom control unit 344 controls zooming of the image taking lens 310.

A lens system control circuit 350 controls the entire lens unit 300. The lens system control circuit 350 includes a function of a non-volatile memory that stores identification information such as a number unique to a memory and the lens unit 300 that store a constant, a variant, and a program for operation, management information, an open diaphragm value, a minimum diaphragm value, functional information such as a focal length, and values that are currently or formerly set.

Now, an operation of the digital camera according to the first exemplary embodiment is described with reference to FIGS. 2 through 8.

Figure 2:
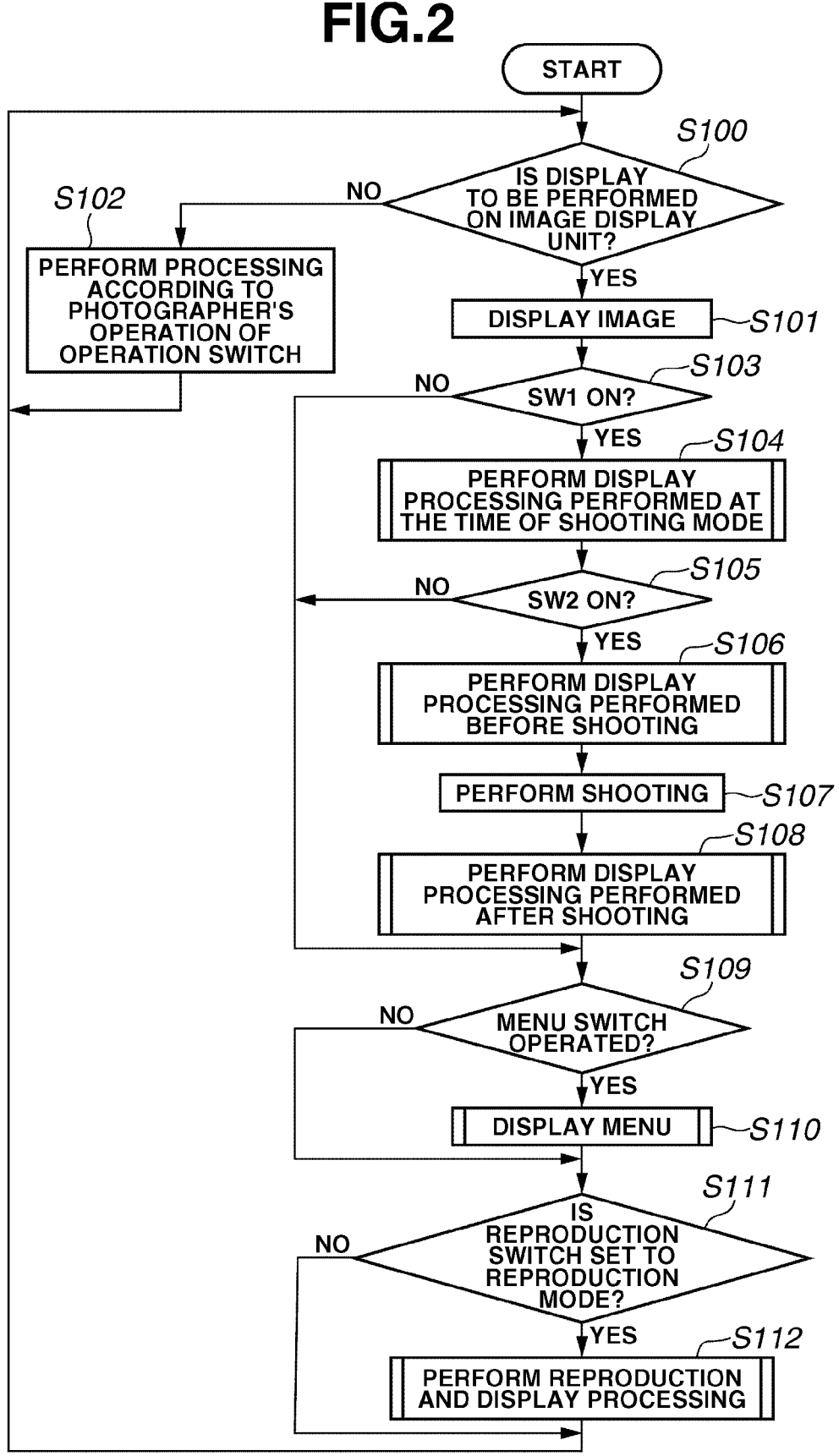
FIG. 2 is a flow chart illustrating a main operation of the digital camera according to the first exemplary embodiment of the present invention.

FIG. 2 is a flow chart illustrating a main operation of the system control circuit 50 of the digital camera according to the first exemplary embodiment.

First, in step S100, the system control circuit 50 determines whether a setting is performed so that an image is displayed on the image display unit 28. If it is determined in step S101 that a setting is made so that an image is displayed on the image display unit 28 (YES in step S100), then in step S101, the system control circuit 50 stores an image that was just taken into the image display memory A 24, and displays the image stored in the image display memory A 24 on the image display unit 28. On the other hand, if it is set such that an image is not displayed on the image display unit 28 (NO in step S100), then in step S102, the system control circuit 50 performs processing according to photographer's operation of an operation switch. Then, the processing returns to step S100.

When the shutter SW1 is turned on (YES in step S103), the digital camera shifts to a shooting mode. In step S104, the system control circuit 50 performs display processing which is to be executed at the time of the shooting mode. Then, the processing advances to step S105. When the digital camera does not shift to the shooting mode (NO in step S103), the processing advances to step S109.

When the shutter SW2 is turned on (YES in step S105), the system control circuit 50 performs display processing which is to be executed before shooting in step S106. Then, in step S107, the system control circuit 50 starts a shooting operation. In step S108, the system control circuit 50 performs processing for displaying a shot image, which is performed after shooting. Then, the processing advances to step S109.

In step S109, the system control circuit 50 determines an operation of a menu switch. If it is determined that the menu switch is turned on (YES in step S109), then in step S110, the system control circuit 50 performs processing for displaying a menu. Then, the processing advances to step S111. If it is determined that the menu switch is not turned on (NO in step S109), then the processing advances to step S111.

In step S111, the system control circuit 50 determines an operation of the reproduction switch 66. If it is determined in step S111 that the reproduction switch 66 is set to a reproduction mode, then in step S112, the system control circuit 50 performs reproduction display processing. Then, the processing returns to step S100 to repeat the main flow of the processing. If it is determined in step S111 that the reproduction switch 66 is not set to a reproduction mode, then the processing returns to step S100.

Figure 3:
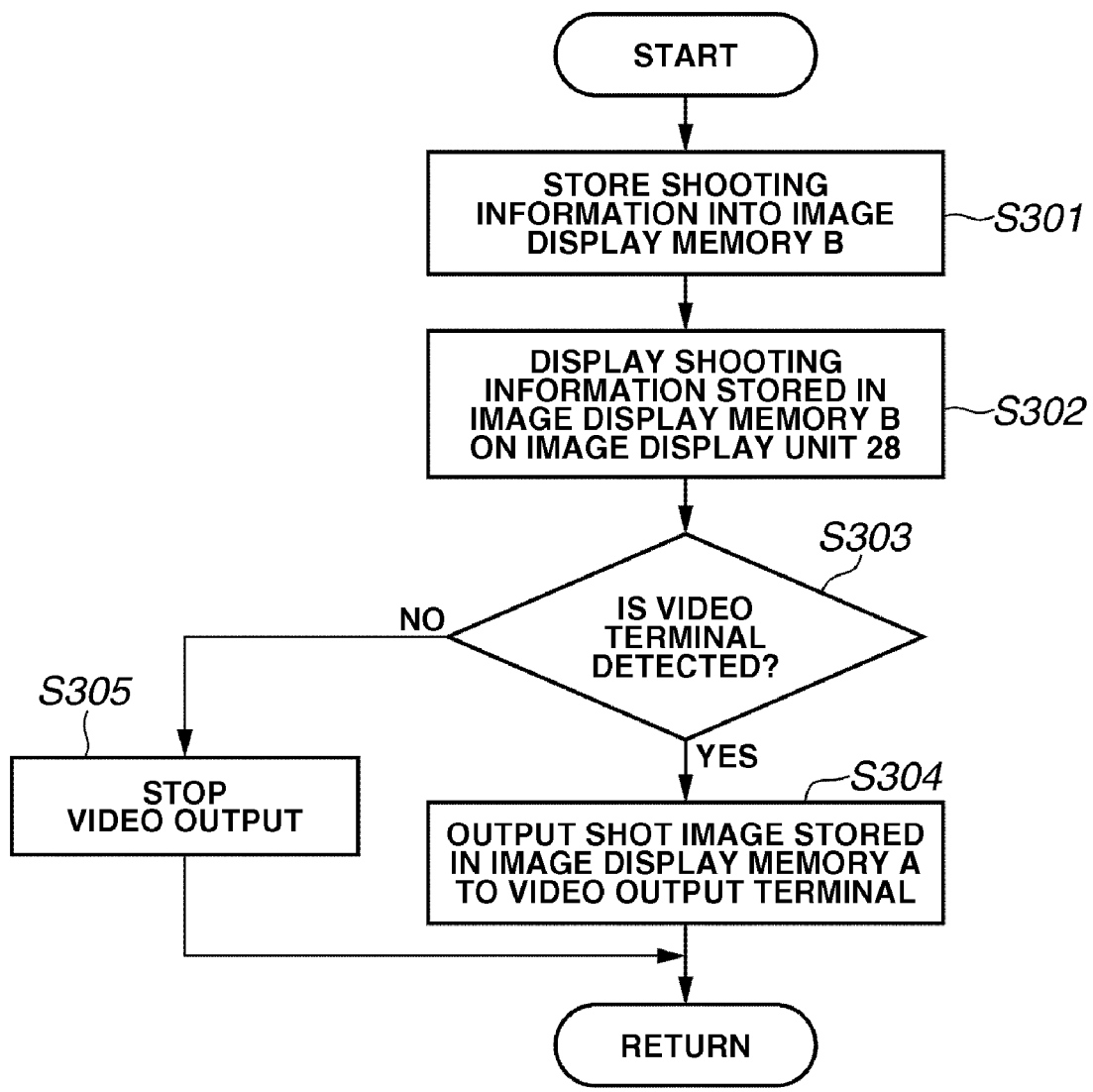
FIG. 3 is a flow chart illustrating details of a subroutine of display processing performed at the time of a shooting mode of the digital camera according to the first exemplary embodiment of the present invention.

FIG. 3 is a flow chart illustrating details of the display processing performed at the time of the shooting mode in step S104 illustrated in FIG. 2.

First, in step S301, the system control circuit 50 stores shooting information into the image display memory B 34 according to a shooting setting of the digital camera. Here, various shooting information indicating a state of the digital camera generated by the system control circuit 50, is stored in the image display memory B 34. The various shooting information includes information such as a shutter speed, a diaphragm value, a recording image quality, a remaining amount of charge of a battery, and a number of images which can be shot. Then, in step S302, the system control circuit 50 displays the shooting information stored in the image display memory B 34 on the image display unit 28.

In step S303, the system control circuit 50 determines whether an external monitor is connected to the external output terminal 38.

If it is determined in step S303 that no external monitor is connected to the external output terminal 38 (NO in step S303), then the processing advances to step S305. In step S305, the system control circuit 50 stops a video output, and then advances to step S105 in the main flow of the processing. On the other hand, if it is determined in step S303 that an external monitor is connected to the external output terminal 38 (YES in step S303), then the processing advances to step S304. In step S304, the system control circuit 50 outputs an image stored in the image display memory A 24 to the external output terminal 38, and then the processing advances to step S105 in the main flow of the processing.

Figure 4:
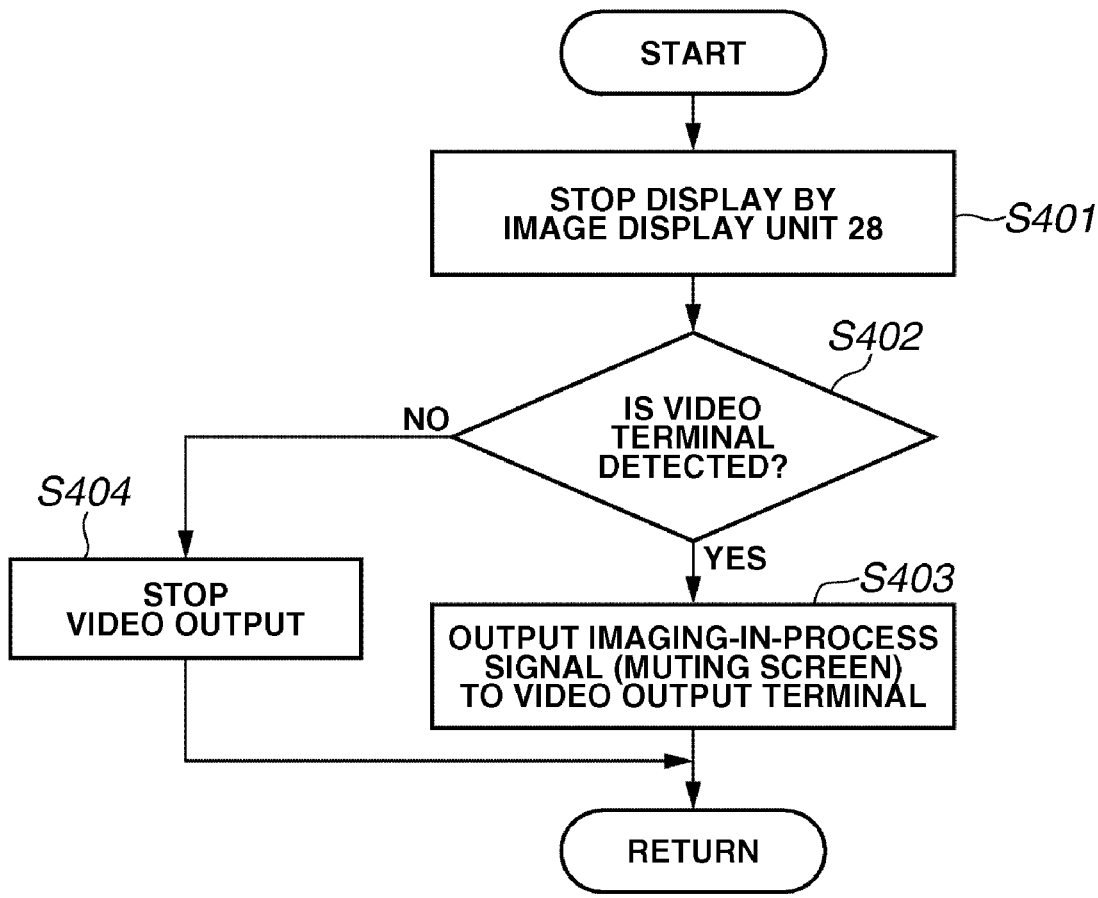
FIG. 4 is a flow chart illustrating details of a subroutine of a display performed before shooting by the digital camera according to the first exemplary embodiment of the present invention.

FIG. 4 is a flow chart illustrating details of the display processing performed before shooting in step S106 illustrated in FIG. 2.

First, in step S401, the system control circuit 50 stops the display by the image display unit 28. In step S402, the system control circuit 50 determines whether an external monitor is connected to the external output terminal 38.

If it is determined in step S402 that no external monitor is connected to the external output terminal 38 (NO in step S402), then the processing advances to step S404. In step S404, the system control circuit 50 stops a video output, and then advances to step S107 in the main flow of the processing. On the other hand, if it is determined in step S402 that an external monitor is connected to the external output terminal 38 (YES in step S402), then the processing advances to step S403. In step S403, the system control circuit 50 outputs an imaging-in-process signal (a muting screen) to the external output terminal 38, and then the processing advances to step S107 in the main flow of the processing.

Figure 5:
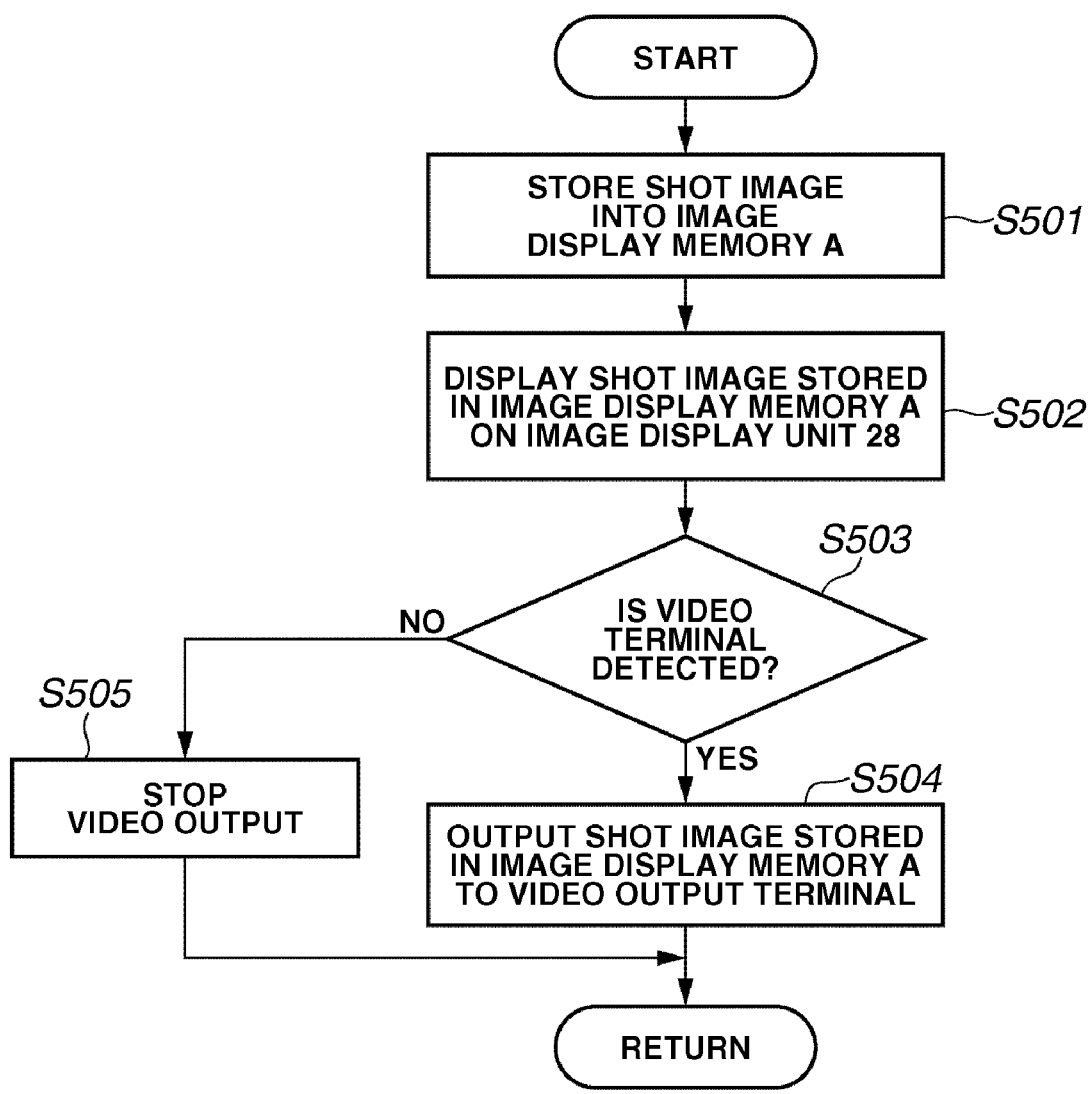
FIG. 5 is a flow chart illustrating details of a subroutine by a display performed after shooting of the digital camera according to the first exemplary embodiment of the present invention.

FIG. 5 is a flow chart illustrating details of the display processing performed after shooting in step S108 in FIG. 2.

First, in step S501, the system control circuit 50 stores an image that was just taken into the image display memory A 24. In step S502, the system control circuit 50 displays the shot image stored in the image display memory A 24 on the image display unit 28. In step S503, the system control circuit 50 determines whether an external monitor is connected to the external output terminal 38.

If it is determined in step S503 that no external monitor is connected to the external output terminal 38 (NO in step S503), then the processing advances to step S505. In step S505, the system control circuit 50 stops a video output, and then advances to step S109 in the main flow of the processing. On the other hand, if it is determined in step S503 that an external monitor is connected to the external output terminal 38 (YES in step S503), then the processing advances to step S504. In step S504, the system control circuit 50 outputs the just shot image stored in the image display memory A 24 to the external output terminal 38, and then the processing advances to step S109 in the main flow of the processing.

Figure 6:
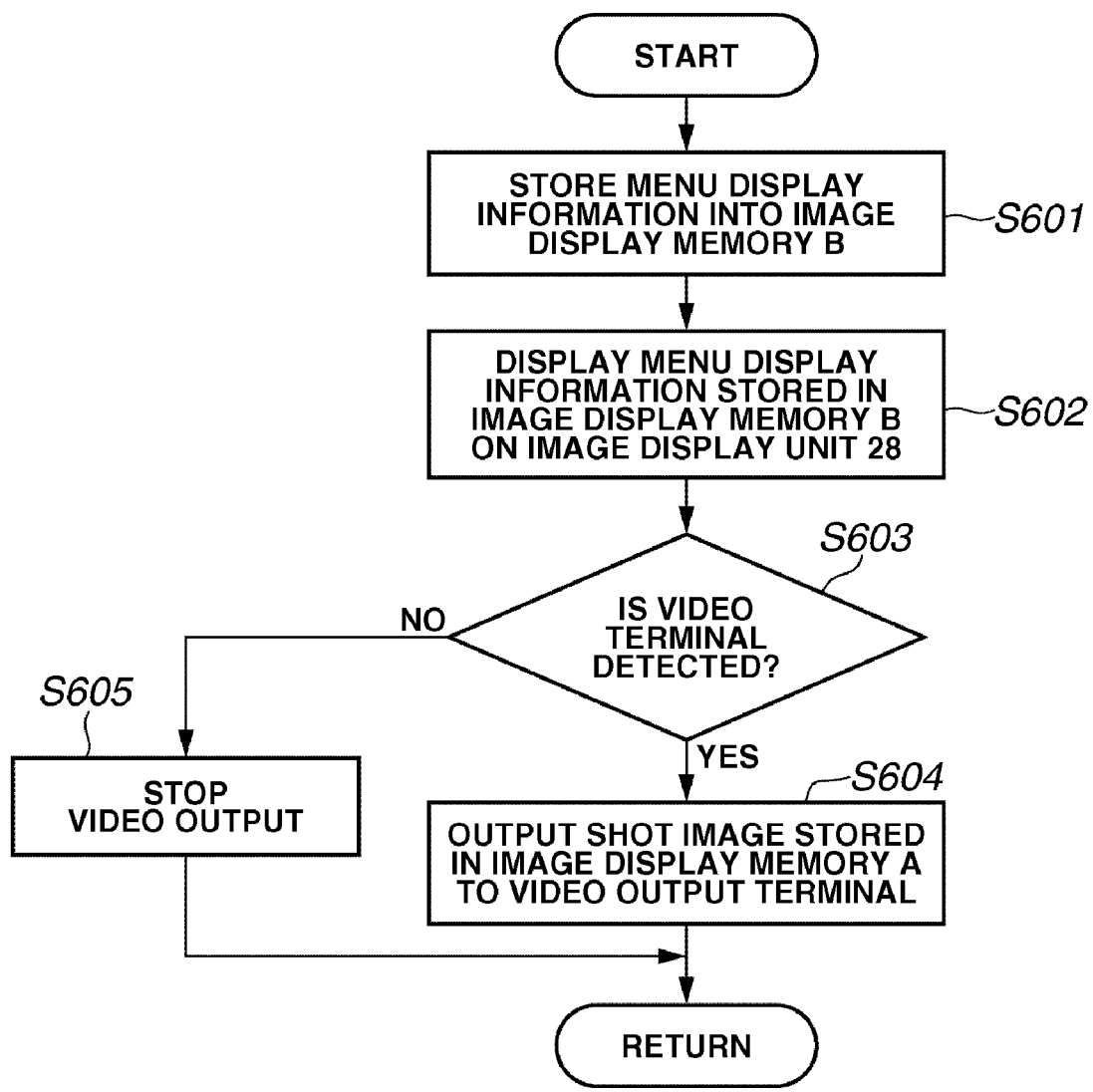
FIG. 6 is a flow chart illustrating details of a subroutine of a menu display in the digital camera according to the first exemplary embodiment of the present invention.

FIG. 6 is a flow chart illustrating details of the menu display processing in step S110 illustrated in FIG. 2.

First, in step S601, the system control circuit 50 stores menu display information of the digital camera into the image display memory B 34. In step S602, the system control circuit 50 displays the menu display information stored in the image display memory B 34 on the image display unit 28.

In step S603, the system control circuit 50 determines whether an external monitor is connected to the external output terminal 38. If it is determined in step S603 that no external monitor is connected to the external output terminal 38 (NO in step S603), then the processing advances to step S605. In step S605, the system control circuit 50 stops a video output, and then advances to step S111 in the main flow of the processing. On the other hand, if it is determined in step S603 that an external monitor is connected to the external output terminal 38 (YES in step S603), then the processing advances to step S604. In step S604, the system control circuit 50 outputs an image stored in the image display memory A 24 to the external output terminal 38, and then the processing advances to step S111 in the main flow of the processing.

Figure 7:
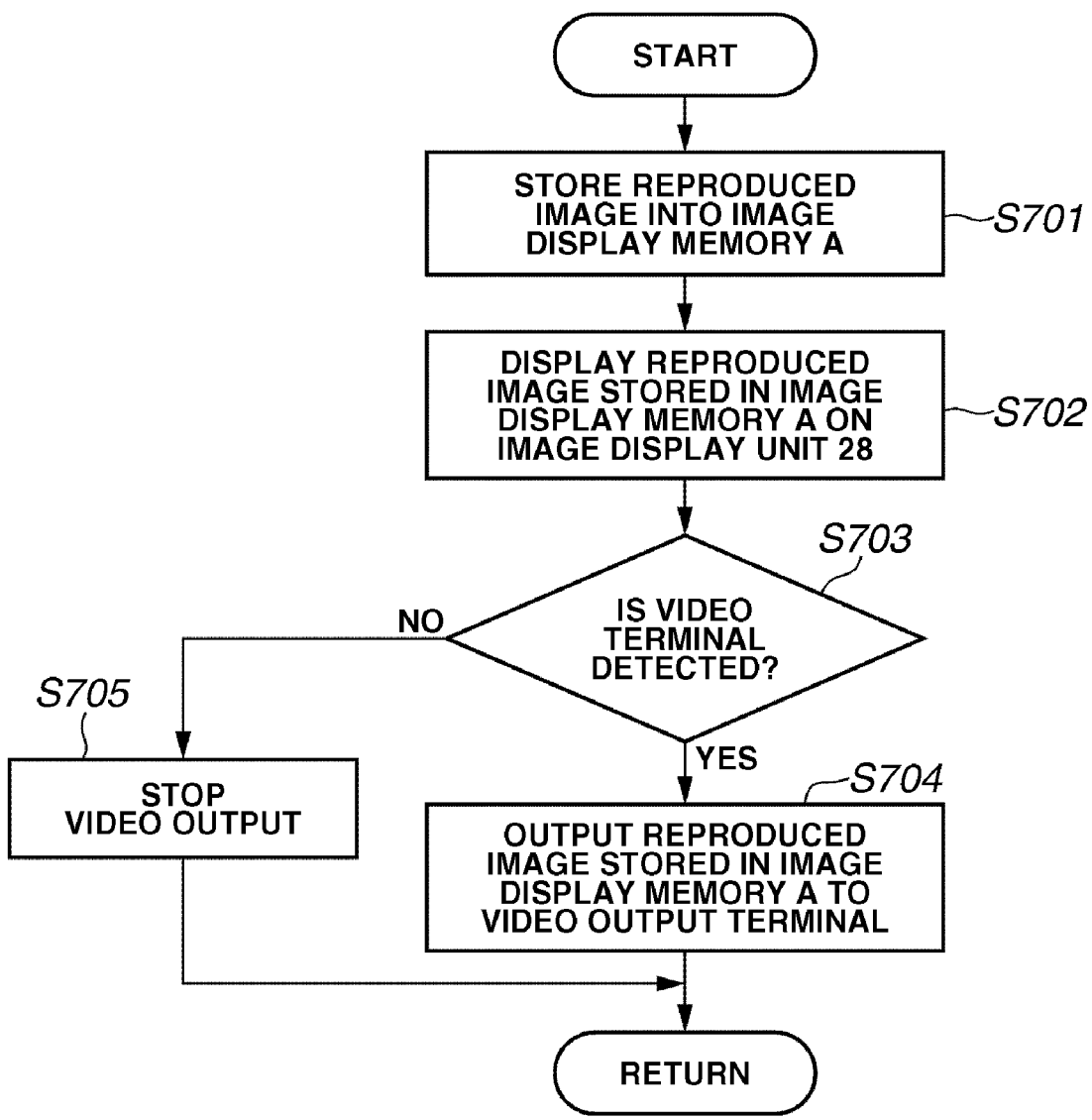
FIG. 7 is a flow chart illustrating details of a subroutine of a reproduction display in the digital camera according to the first exemplary embodiment of the present invention.

FIG. 7 is a flow chart illustrating details of the reproduction display processing in step S112 illustrated in FIG. 2.

First, in step S701, the system control circuit 50 stores an image recorded onto the recording medium 200 or 210 into the image display memory A 24. In step S702, the system control circuit 50 displays the shooting information stored in the image display memory A 24 on the image display unit 28.

In step S703, the system control circuit 50 determines whether an external monitor is connected to the external output terminal 38. If it is determined in step S703 that no external monitor is connected to the external output terminal 38 (NO in step S703), then the processing advances to step S705. In step S705, the system control circuit 50 stops a video output, and then returns to step S101 in the main flow of the processing. On the other hand, if it is determined in step S703 that an external monitor is connected to the external output terminal 38 (YES in step S703), then the processing advances to step S704. In step S704, the system control circuit 50 outputs an image stored in the image display memory A 24 to the external output terminal 38, and then the processing returns to step S100 in the main flow of the processing.

Figure 8:
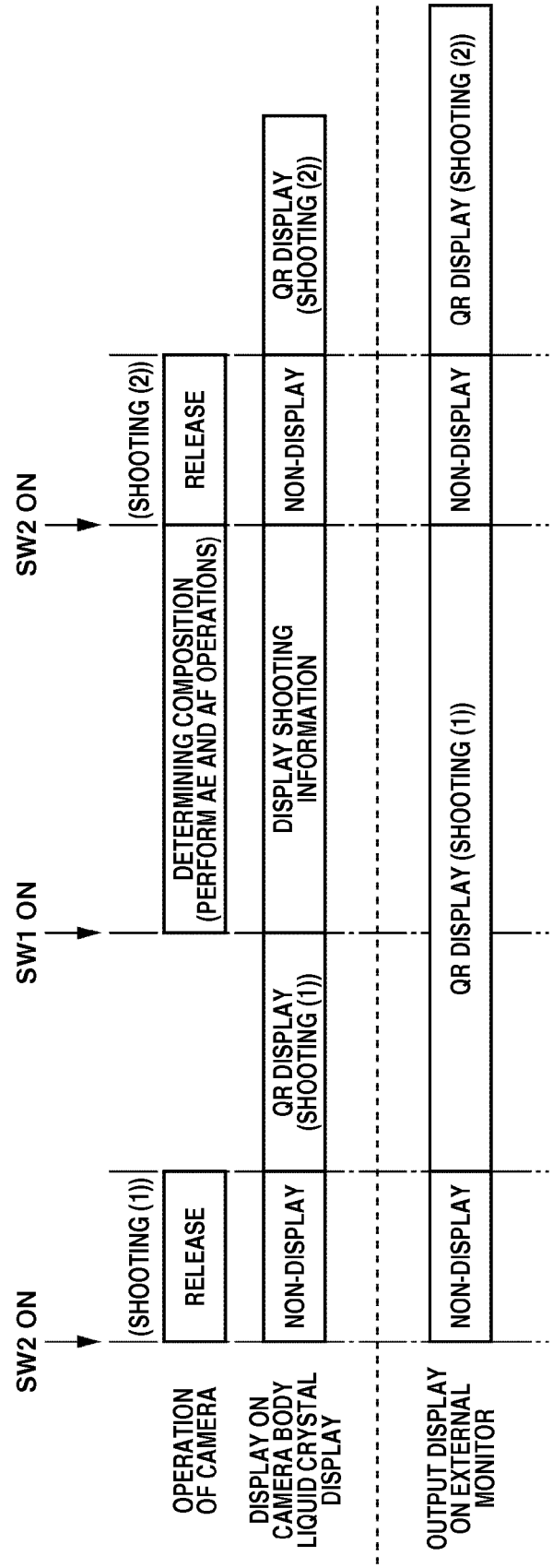
FIG. 8 is a sequence chart according to the first exemplary embodiment of the present invention.

FIG. 8 is a sequence chart according to the first exemplary embodiment. When the shutter switch SW1 62 is turned on, shooting information is displayed on the image display unit 28 of the digital camera. Meanwhile, an image taken in a previous shooting operation is continuously displayed on an external monitor connected to the external output terminal 38. A "QR display" in FIG. 8 is an abbreviation of a "quick review display", in which an image just shot is reproduced.

Second Exemplary Embodiment

Now, a second exemplary embodiment of the present invention is described. A configuration of the digital camera according to the second exemplary embodiment is similar to the first exemplary embodiment illustrated in FIG. 1. Accordingly, an explanation thereof is omitted here.

An operation of the digital camera according to the second exemplary embodiment is described with reference to flow charts illustrated in FIGS. 9 through 13, and FIG. 14.

Figure 9:
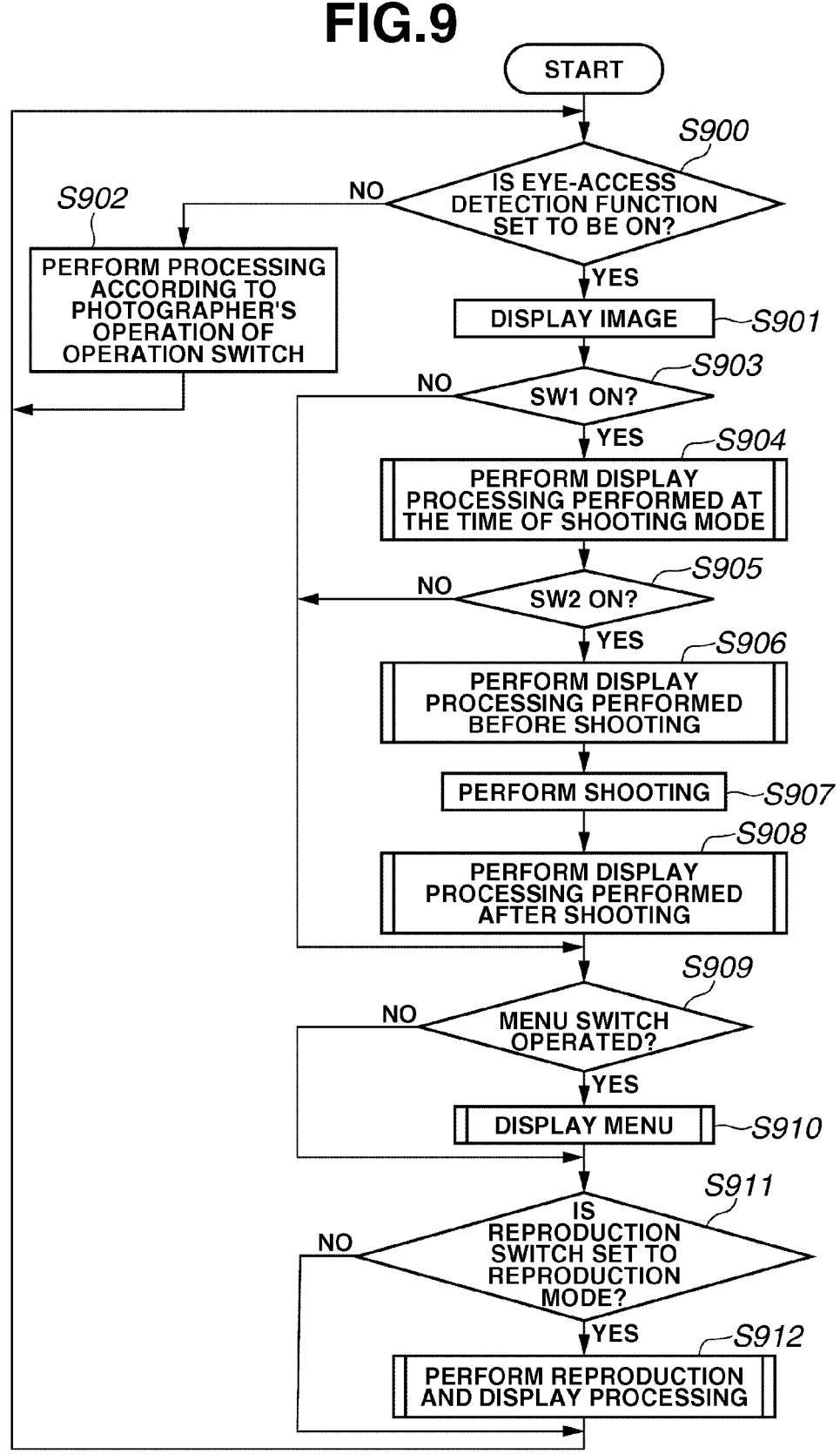
FIG. 9 is a flow chart illustrating a main operation of the digital camera according to a second exemplary embodiment of the present invention.

FIG. 9 is a flow chart illustrating main operation processing performed by the system control circuit 50 of the digital camera according to the second exemplary embodiment.

First, in step S900, the system control circuit 50 determines whether the eye-access detection function is on or off. If it is determined in step S900 that the eye-access detection function is on (YES in step S900), then in step S901, the system control circuit 50 stores the image that was just shot, into the image display memory A 24 and displays the image stored in the image display memory A 24 on the image display unit 28. On the other hand, if it is determined in step S900 that the eye-access detection function is off (NO in step S900), then in step S902, the system control circuit 50 performs processing according to photographer's operation of the operation switch. Then, the system control circuit 50 returns to step S900.

When the shutter SW1 is turned on (YES in step S903), the digital camera shifts to a shooting mode and the processing proceeds to step S904. When the shutter SW1 is off (NO in step S903), the digital camera does not shift to a shooting mode, and instead the processing advances to step S909. In step S904, the system control circuit 50 performs display processing which is to be carried out at the time of the shooting mode. Then, the system control circuit 50 advances to step S905. When the digital camera does not shift to a shooting mode (NO in step S905), the system control circuit 50 advances to step S909. When the shutter SW2 is turned on (YES in step S905), the system control circuit 50 performs display processing which is to be carried out before shooting in step S906. Then, in step S907, the system control circuit 50 starts a shooting operation. In step S908, the system control circuit 50 performs processing for displaying a shot image, which is performed after shooting. Then, the processing advances to step S909. In step S909, the system control circuit 50 determines an operation of a menu switch. If it is determined that the menu switch is turned on (YES in step S909), then in step S910, the system control circuit 50 performs processing for displaying a menu. Then, the processing advances to step S911. If it is determined that the menu switch is has not been turned on (NO in step S909), then the processing advances directly to step S911.

In step S911, the system control circuit 50 determines an operation of the reproduction switch 66. If it is determined in step S911 that the reproduction switch 66 is set to a reproduction mode (YES in step S911), then in step S912, the system control circuit 50 performs reproduction display processing. Then, the processing returns to step S900 to repeat the main flow of the processing. If it is determined in step S911 that the reproduction switch 66 is not set to a reproduction mode (NO in step S911), then the processing returns directly to step S900.

Figure 10:
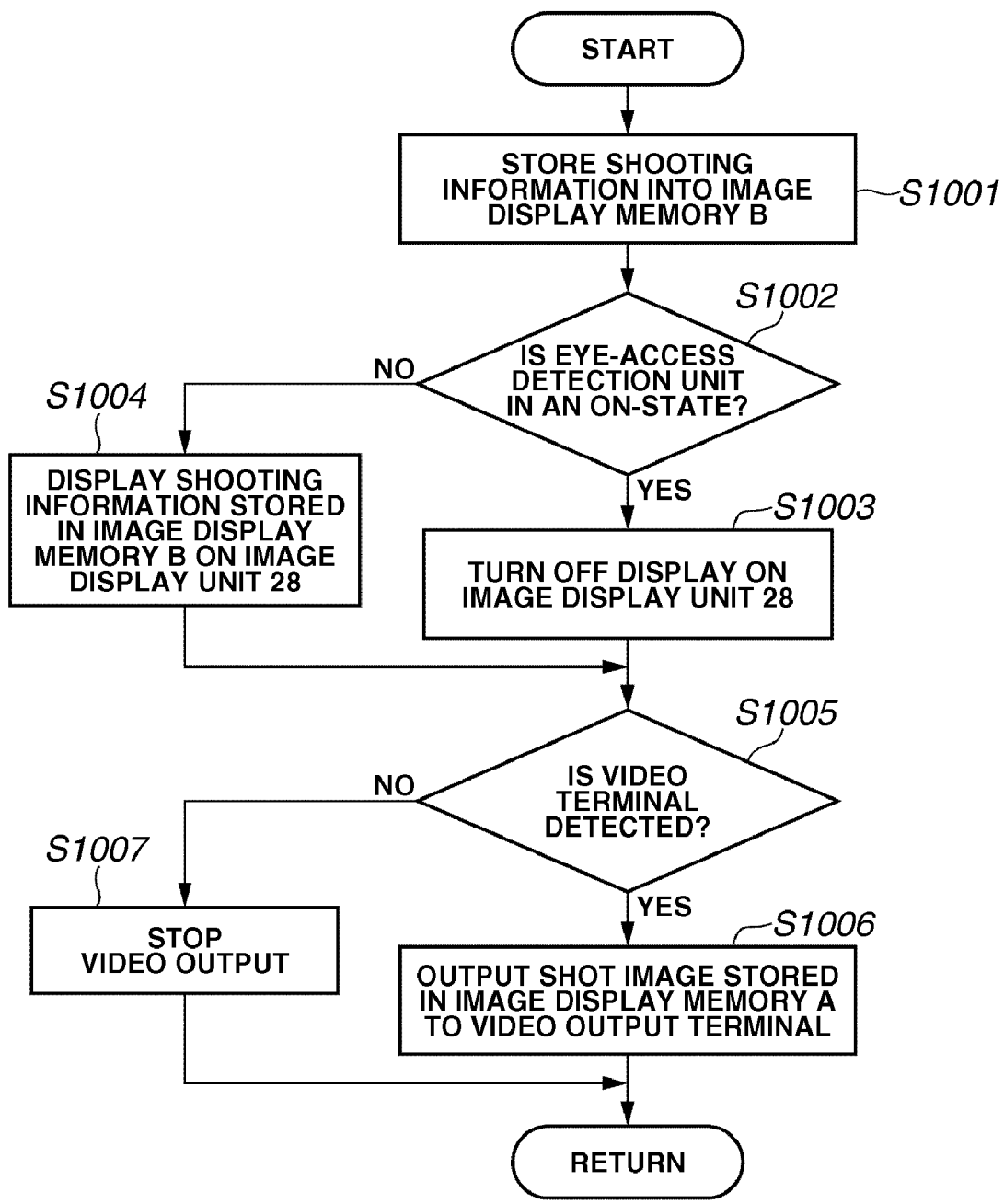
FIG. 10 is a flow chart illustrating details of a subroutine of display processing performed at the time of a shooting mode of the digital camera according to the second exemplary embodiment of the present invention.

FIG. 10 is a flow chart illustrating details of the display processing performed at the time of the shooting mode in step S904 illustrated in FIG. 9.

First, in step S1001, the system control circuit 50 stores shooting information into the image display memory B 34 according to a shooting setting of the digital camera. Here, various shooting information indicating a state of the digital camera, which is generated by the system control circuit 50, is stored in the image display memory B 34. The various shooting information includes a shutter speed, a diaphragm value, a recording image quality, a remaining amount of charge of a battery, and a number of images which can be shot.

In step S1002, the system control circuit 50 determines the state of the eye-access detection unit 400. If it is determined in step S1002 that the eye-access detection unit 400 is in an on-state (YES in step S1002), then in step S1003, the system control circuit 50 turns off the display on the image display unit 28. On the other hand, if it is determined in step S1002 that the eye-access detection unit 400 is not in an on-state (NO in step S1002), then in step S1004, the system control circuit 50 displays shooting information stored in the image display memory B 34 on the image display unit 28.

In step S1005, the system control circuit 50 determines whether an external monitor is connected to the external output terminal 38. If it is determined in step S1005 that no external monitor is connected to the external output terminal 38 (NO in step S1005), then the processing advances to step S1007. In step S1007, the system control circuit 50 stops a video output, and then advances to step S905 in the main flow of the processing. On the other hand, if it is determined in step S1005 that an external monitor is connected to the external output terminal 38 (YES in step S1005), then the processing advances to step S1006. In step S1006, the system control circuit 50 stores the image that was just shot into the image display memory A 24 and outputs the image stored in the image display memory A 24 to the external output terminal 38, and then the processing advances to step S905 in the main flow of the processing.

Details of the display processing performed before shooting in step S906 illustrated in FIG. 9 are similar to those in the flow chart illustrated in FIG. 4 according to the first exemplary embodiment. Accordingly, a description thereof is omitted here.

Figure 11:
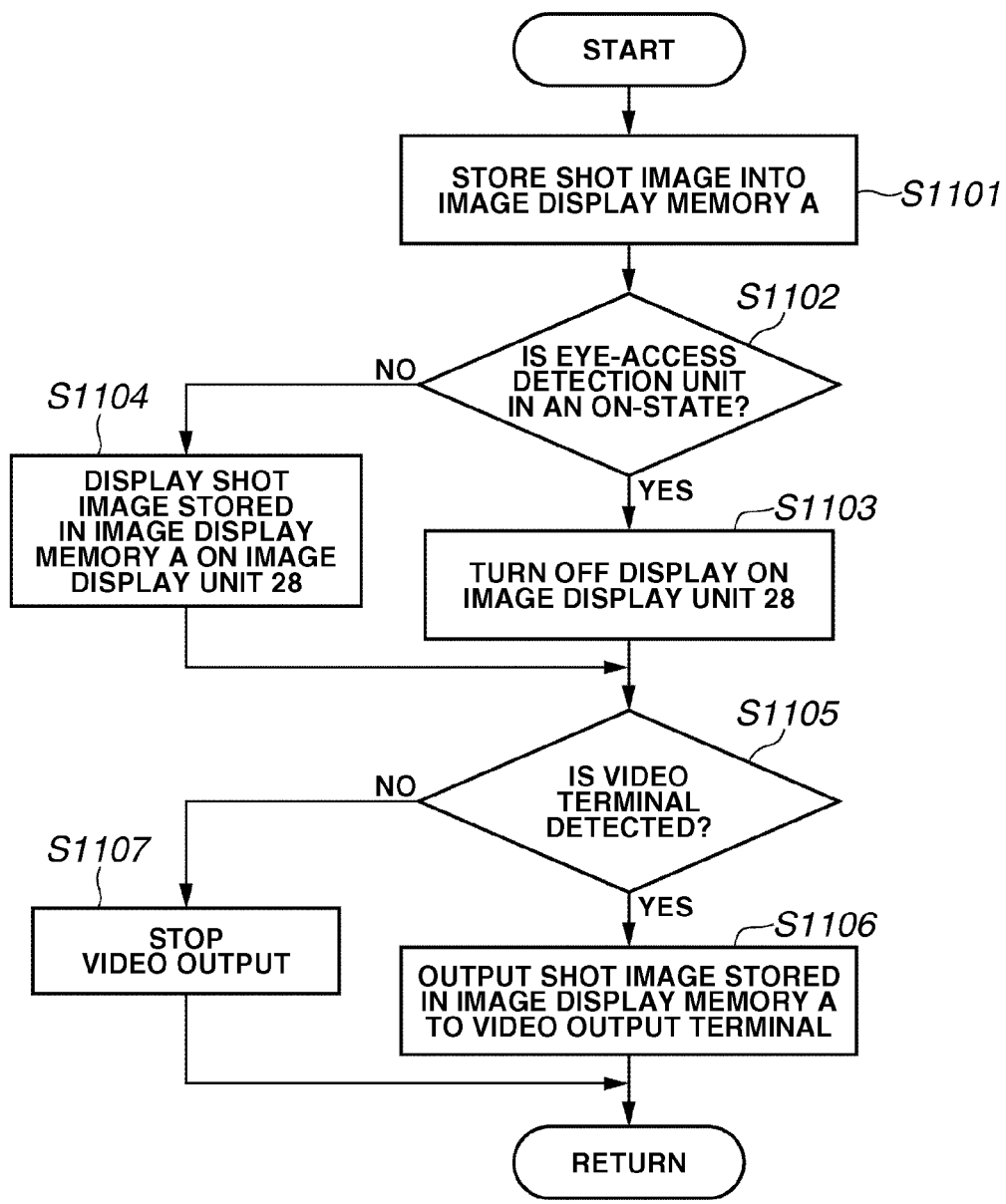
FIG. 11 is a flow chart illustrating details of a subroutine of a display performed after shooting by the digital camera according to the second exemplary embodiment of the present invention.

FIG. 11 is a flow chart illustrating details of the display processing performed after shooting in step S908 in FIG. 9.

First, in step S1101, the system control circuit 50 stores an image just taken, into the image display memory A 24.

In step S1102, the system control circuit 50 determines the state of the eye-access detection unit 400. If it is determined in step S1102 that the eye-access detection unit 400 is in an on-state (YES in step S1102), then in step S1103, the system control circuit 50 turns off the display on the image display unit 28. On the other hand, if it is determined in step S1102 that the eye-access detection unit 400 is not in an on-state (NO in step S1102), then in step S1104, the system control circuit 50 displays the shot image stored in the image display memory B 24 on the image display unit 28.

In step S1105, the system control circuit 50 determines whether an external monitor is connected to the external output terminal 38. If it is determined in step S1105 that no external monitor is connected to the external output terminal 38 (NO in step S1105), then the processing advances to step S1107. In step S1107, the system control circuit 50 stops a video output, and then advances to step S909 in the main flow of the processing. On the other hand, if it is determined in step S1105 that an external monitor is connected to the external output terminal 38 (YES in step S1105), then the processing advances to step S1106. In step S1106, the system control circuit 50 outputs an image stored in the image display memory A 24 to the external output terminal 38, and then the processing advances to step S909 in the main flow of the processing.

Figure 12:
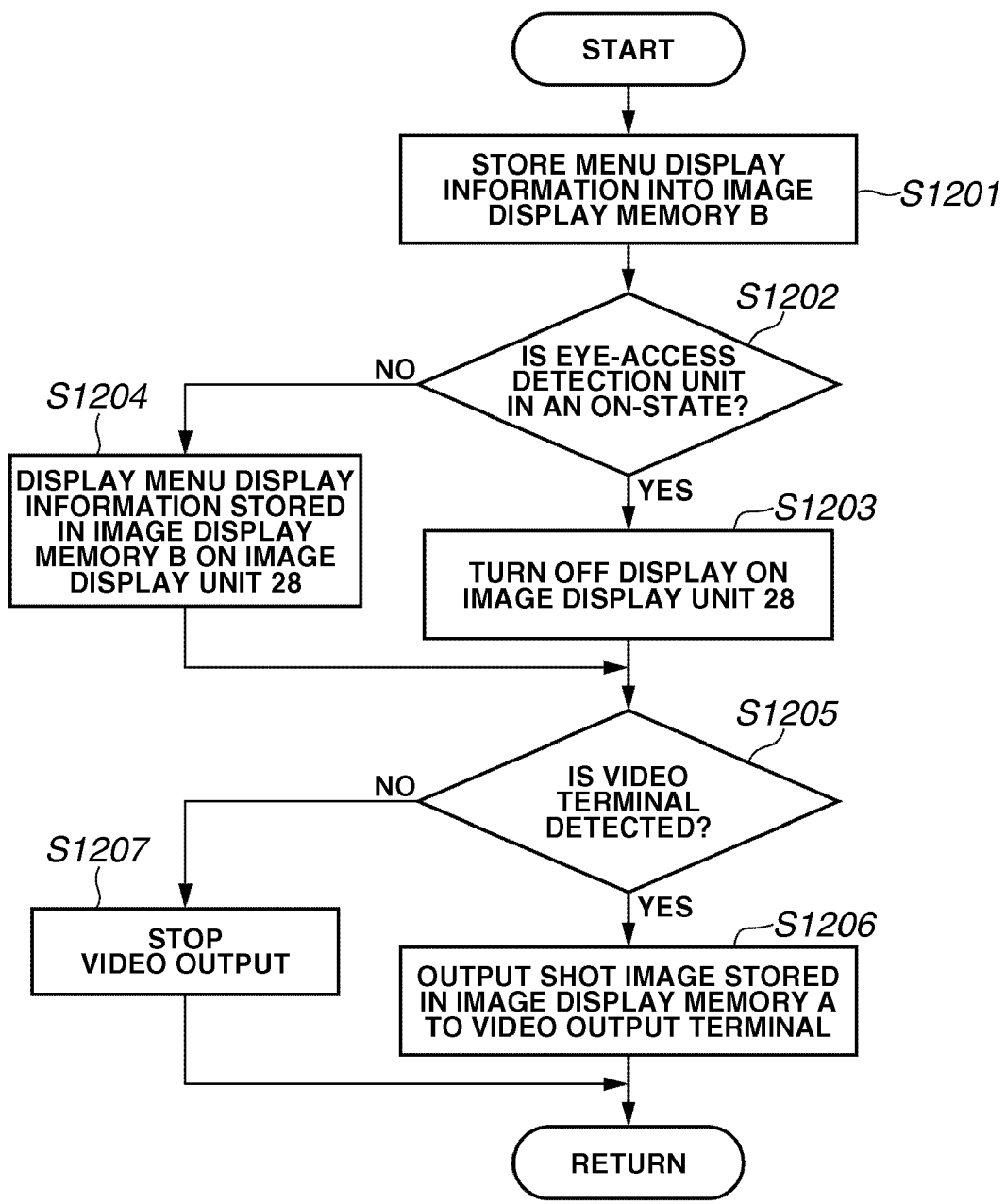
FIG. 12 is a flow chart illustrating details of a subroutine of a menu display in the digital camera according to the second exemplary embodiment of the present invention.

FIG. 12 is a flow chart illustrating details of the menu display processing in step S910 illustrated in FIG. 9.

First, in step S1201, the system control circuit 50 stores menu display information of the digital camera into the image display memory B 34. In step S1202, the system control circuit 50 determines the state of the eye-access detection unit 400. If it is determined in step S1202 that the eye-access detection unit 400 is in an on-state (YES in step S1202), then in step S1203, the system control circuit 50 turns off the display on the image display unit 28. On the other hand, if it is determined in step S1202 that the eye-access detection unit 400 is not in an on-state (NO in step S1202), then in step S1204, the system control circuit 50 displays shooting information stored in the image display memory B 34 on the image display unit 28.

In step S1205, the system control circuit 50 determines whether an external monitor is connected to the external output terminal 38. If it is determined in step S1205 that no external monitor is connected to the external output terminal 38 (NO in step S1205), then the processing advances to step S1207. In step S1207, the system control circuit 50 stops a video output, and then advances to step S911 in the main flow of the processing. On the other hand, if it is determined in step S1205 that an external monitor is connected to the external output terminal 38 (YES in step S1205), then the processing advances to step S1206. In step S1206, the system control circuit 50 stores a just shot image into the memory A 24 and outputs the image stored in the image display memory A 24 to the external output terminal 38. Then the processing advances to step S911 in the main flow of the processing.

Figure 13:
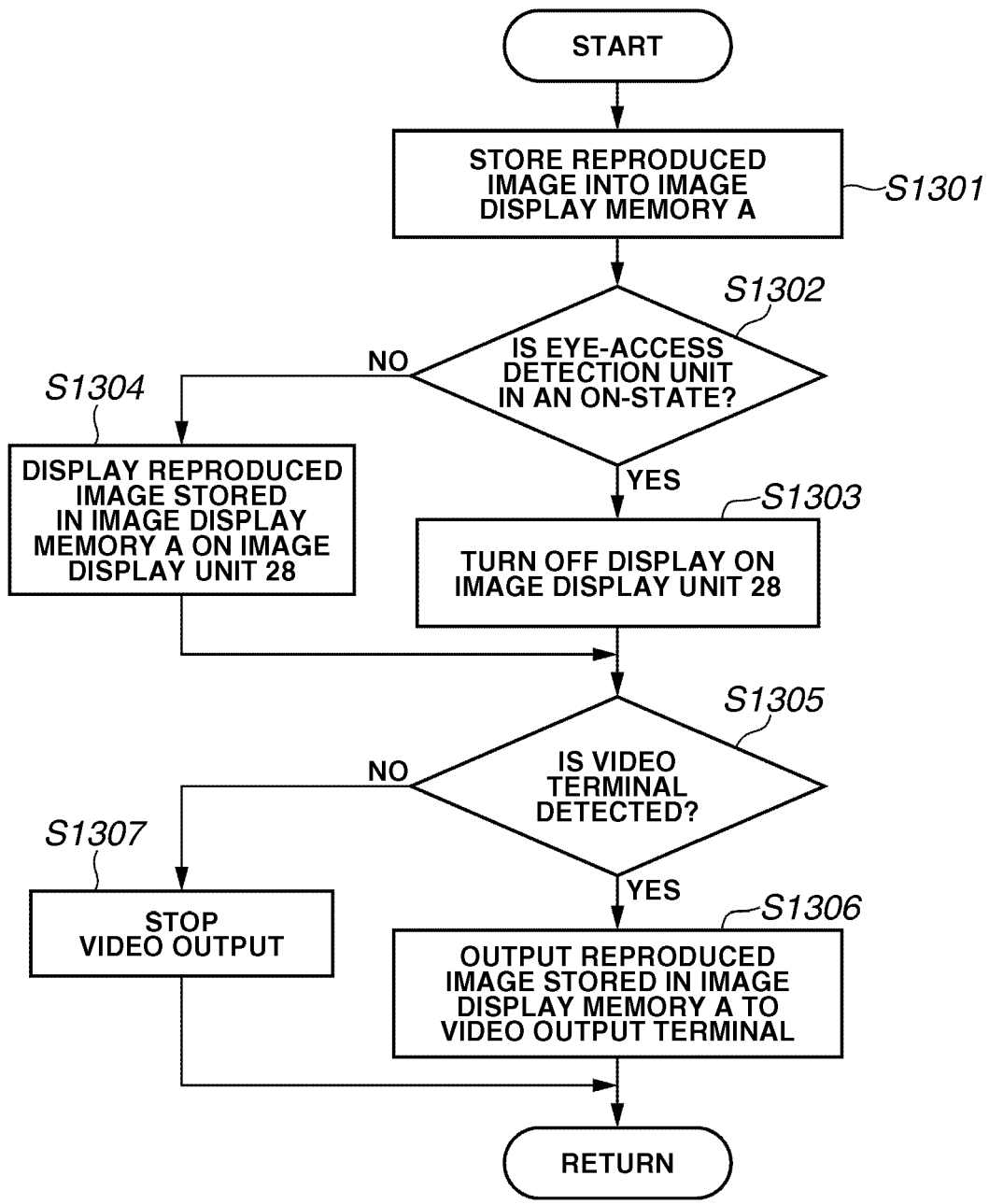
FIG. 13 is a flow chart illustrating details of a subroutine of a reproduction display in the digital camera according to the second exemplary embodiment of the present invention.

FIG. 13 is a flow chart illustrating details of the reproduction display processing in step S912 illustrated in FIG. 9.

First, in step S1301, the system control circuit 50 stores an image recorded onto the recording medium 200 or 210 into the image display memory A 24.

In step S1302, the system control circuit 50 determines the state of the eye-access detection unit 400. If it is determined in step S1302 that the eye-access detection unit 400 is in an on-state (YES in step S1302), then in step S1303, the system control circuit 50 turns off the display on the image display unit 28. On the other hand, if it is determined in step S1302 that the eye-access detection unit 400 is not in an on-state (NO in step S2302), then in step S1304, the system control circuit 50 displays a reproduction image stored in the image display memory A 24 on the image display unit 28. In step S1305, the system control circuit 50 determines whether an external monitor is connected to the external output terminal 38. If it is determined in step S1305 that no external monitor is connected to the external output terminal 38 (NO in step S1305), then the processing advances to step S1307. In step S1307, the system control circuit 50 stops a video output, and then returns to step S900 in the main flow of the processing. On the other hand, if it is determined in step S1305 that an external monitor is connected to the external output terminal 38 (YES in step S1305), then the processing advances to step S1306. In step S1306, the system control circuit 50 outputs an image stored in the image display memory A 24 to the external output terminal 38, and then the processing returns to step S900 in the main flow of the processing.

FIG. 14 is a sequence chart according to the second exemplary embodiment. If it is determined that the eye-access detection unit 400 is in an on-state, the image display unit 28 of the digital camera stops the display, while a just shot image is continuously displayed on an external monitor connected to the external output terminal 38. A "QR display" in FIG. 14 is an abbreviation of a "quick review display", in which an image that was just shot is reproduced.

As described above, in the exemplary embodiments of the present invention, even when a display on the display unit of the digital camera is switched to a screen other than the shot or reproduced image according to photographer's operation via the operation unit, the output signal to the external monitor terminal allows the shot or reproduced image to be continuously displayed. Thus, the user's convenience of the digital camera can be improved.

In the exemplary embodiments described above, the content of the display on the display unit of the digital camera and the content of the display on the external monitor are switched each other. However, according to a menu setting, the content of the display on the display unit of the digital camera and the content of the display on the external monitor can be the same.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-080909 filed Mar. 23, 2006, which is hereby incorporated by reference herein in its entirety.

What is claimed:

1. An imaging apparatus including a finder, the imaging apparatus comprising:
   a) a display device configured to display a shot image;
   b) an external monitor output unit configured to output a signal to an external monitor;
   c) an eye-access detection unit configured to detect when a photographer's eye approaches the finder; and
   d) a control unit configured to, when it is determined that the photographer's eye does not approach the finder by the eye-access detection unit, control the display device to display the shot image, and at the same time, control the external monitor output unit to output the signal to display the shot image to the external monitor, and when it is determined that the photographer's eye approaches the finder by the eye-access detection unit, control the display device to stop displaying the shot image and control the external monitor output unit to continue to output the signal to the external monitor.

2. A method for controlling an imaging apparatus including an eye-access detection unit configured to detect that a photographer's eye approaches a finder, a display device configured to display a shot image, and an external monitor output unit configured to output a signal to an external monitor, the method comprising:
   a) detecting by the eye-access detection unit that a photographer's eye approaches the finder;
   b) when it is detected that a photographer's eye approaches the finder, stopping a display on the display device and performing control so that an output of a signal to the external monitor output unit is continued; and
   c) when it is determined that the photographer's eye does not approach the finder by the eye-access detection unit, controlling the display device to display the shot image, and at the same time, controlling the external monitor output unit to output the shot image to the external monitor.

3. A computer-readable storage medium containing computer-executable instructions for controlling an imaging apparatus including an eye-access detection unit configured to detect that a photographer's eye approaches a finder, a display device configured to display a shot image, and an external monitor output unit configured to output a signal to an external monitor, the computer-readable storage medium comprising:

a) computer-executable instructions for detecting by the eye-access detection unit that a photographer looks into the finder;

b) computer-executable instructions for, when it is determined that a photographer's eye approaches finder, stopping a display on the display device and performing control so that an output of a signal to the external monitor output unit is continued; and c) computer-executable instructions for, when it is determined that the photographer's eye does not approach the finder by the eye-access detection unit, controlling the display device to display the shot image, and at the same time, controlling the external monitor output unit to output the shot image to the external monitor.

* * * * *